July 6, 1943.　　　　E. C. WATSON　　　　2,323,741

SPEED CONTROL FOR DIRECT CURRENT MOTORS

Filed May 15, 1941

WITNESSES:
E. A. McCloskey.
Wm. J. Ruano

INVENTOR
Earl C. Watson.
BY
Paul E. Friedemann
ATTORNEY

Patented July 6, 1943

2,323,741

UNITED STATES PATENT OFFICE 2,323,741

SPEED CONTROL FOR DIRECT CURRENT MOTORS

Earl C. Watson, Wilkinsburg, Pa., assignor to Westinghouse Electric & Manufacturing Company, East Pittsburgh, Pa., a corporation of Pennsylvania Application May 15, 1941, Serial No. 393,603

11 Claims. (Cl. 172—239)

My invention relates to a speed control system for a direct current motor which is particularly useful to maintain a constant linear speed of a web of paper which is being wound on a roll or unwound from a roll.

In accordance with my invention, as the diameter of the roll increases, the speed of the motor is decreased proportionately so as to keep the paper running at a constant speed. While speed control systems functioning in this manner are well known, they have been found to be unsatisfactory and such systems generally do not maintain a sufficiently constant speed nor are they adjustable within a satisfactorily wide range of speeds.

An object of my invention is to provide a speed control system particularly useful for paper winding or unwinding which maintains the linear speed of the paper at a constant value and which is adjustable for speeds within a wide speed range.

Another object of my invention is to provide a speed control system which is highly reliable, rugged, and relatively inexpensive to manufacture.

Figure 1:
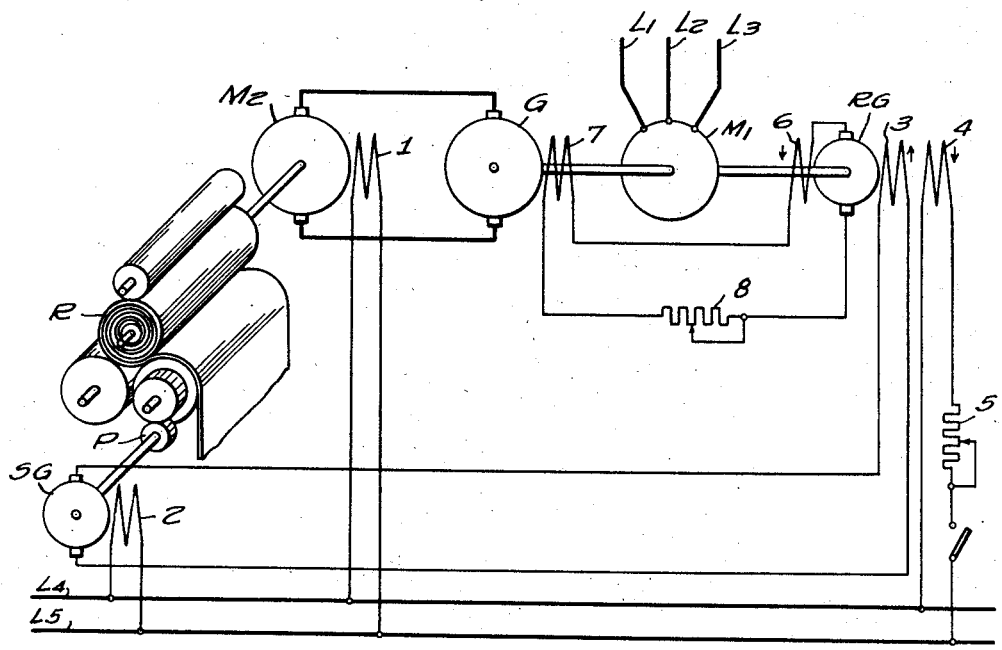
Figure 2:
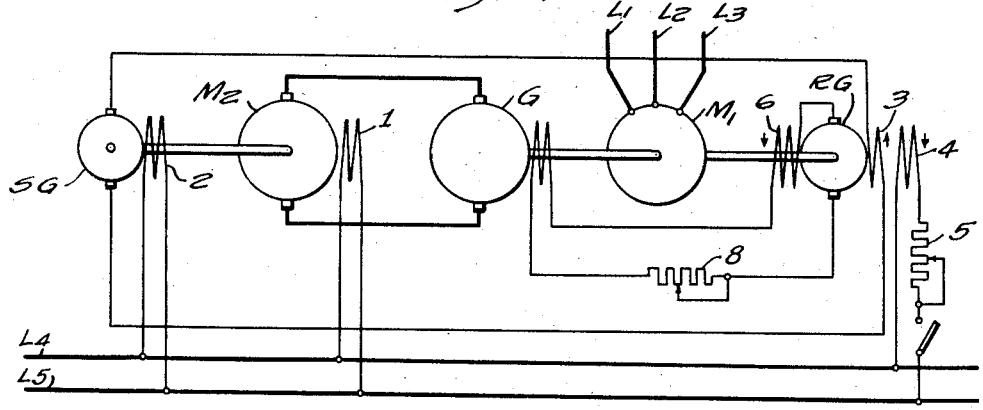

Other objects and advantages will become more apparent from a study of the following specification when considered in conjunction with the accompanying drawing, in which:

Fig. 1 is a schematic showing of a control system in accordance with my invention for driving a coiler and for maintaining a constant linear speed of a web of paper as it is being wound or unwound on a roll; and Fig. 2 is a schematic showing of my invention as applied to keeping a direct current driving motor at constant speed.

Referring to Fig. 1, $M_2$ is the motor used to drive the roll. G is the generator used to furnish power to the motor. $M_1$ is the motor energized by a polyphase source of alternating current indicated by $L_1$—$L_2$—$L_3$ and which may, of course, be any prime mover used to drive the generator G. RG is a regulating generator (or regulator) used to control the speed of motor $M_2$. SG is a speed indicating generator which gives an indication of the paper speed and it is driven by a pilot roller P which may either be frictionally driven by the paper (not shown) or which is geared to the roll R as shown. $L_4$—$L_5$ is a constant potential exciter or else a separate source of direct current power.

The motor $M_2$ is a standard motor and may be either straight shunt or compound wound. The generator, G, is a standard straight shunt wound generator. The motor, $M_1$, is any drive sufficient to supply the power required by the generator, G, and regulator, RG, and the exciter (if mechanically coupled to the shaft of RG).

The regulator, RG, is a special generator which is designed with three fields and is so operated that it does not saturate so that its voltage is proportional to the excitation. The magnetic section is made up of special steel to minimize the effect of hysteresis.

The speed indicating generator, SG, is a standard generator whose output voltage is proportional to the speed. It is similar to the generators used for tachometers.

$L_4$—$L_5$ is any source of direct current voltage and can be a flat compound wound exciter mechanically connected to the motor generator set (not shown) if so desired, but for simplicity is shown by bus terminals $L_4$—$L_5$ denoting a direct current source.

The operation of the scheme is as follows: The motor, $M_2$, has its shunt field 1 connected to the constant source of voltage $L_4$—$L_5$ and is left at full strength. The speed indicating generator SG likewise has its field 2 connected to the constant source of voltage $L_4$—$L_5$. The regulator has three fields in the same magnetic circuit, one a differential field 3 is connected to the armature of the speed indicating generator SG in order to give the regulator an indication of the paper speed. The second field 4 is connected to the constant source of voltage $L_4$—$L_5$, through a rheostat 5. This field 4 is used to adjust for various paper speeds. The third field 6 is connected in series with the armature of regulator RG, the shunt field 7 of the generator G and a balancing resistance 8. The balancing resistance is so adjusted that with one ampere flowing through the third field, 6, sufficient voltage is generated in the regulator to just supply the IR drop caused by one ampere in this circuit.

With the motor generator set running, the motor $M_2$ will not start if the regulator field 4 is open as the regulator armature circuit will not generate voltage so no voltage will be generated by the generator G since it has no excitation. If we energize the regulator field 4, the regulator current will build up causing the generator field to be energized and thus starting the motor. As the motor starts it causes the speed indicating generator SG to energize the regulator field 3. The regulator is so designed that throughout the range of voltage required by the shunt field of the generator G, it will not be saturated. Thus the circuit of the regulator will finally balance when the ampere-turns in the field 4 just balance the ampere-turns in the field 3 (as indicated by the arrows). Now as the diameter of roll R builds up the paper speed tends to increase, the regulator field 3 is strengthened but this is a differential field and is subtracted from the output of winding 6 so the regulator output in the loop circuit connecting the armatures of the generator G and regulator RG drops until the motor speed is reduced in order to maintain the proper paper speed.

The paper speed can be changed by adjusting the excitation of field 4 by varying rheostat 5. Increasing the excitation increases the paper speed and vice versa.

My invention is susceptible of various modifications as follows:

If the speed indicating generator SG is mounted on the driving motor M₂, my scheme can be used to maintain constant speed of the motor. Such an arrangement is shown in Fig. 2. Speed adjustment can still be obtained by means of the rheostat 5 in series with the field 4, but once set the speed will not change due to load fluctuations.

If the speed indicating generator SG is omitted and the differential field 3 is connected across the generator G terminals, this scheme can be used to maintain constant voltage on the generator and this scheme would be a voltage regulator. The rheostat 5 in series with the field 4 can be used to adjust the voltage of the generator.

If the speed indicating generator SG is mounted on the motor M₂ as shown in Fig. 2 and the field 4 is excited from a second speed indicating generator which is mounted on a second motor, this scheme can be used to match the speed of motor M₂ with the speed of such second motor. By varying the rheostat 5 in series with the field 4, the ratio of speeds of the two motors can be varied at will but with one setting of the rheostat the motors will stay in step.

By replacing the speed indicating generators of the modification described in the preceding paragraph and connecting the fields to terminals of the generators as was done in the modification in the second preceding paragraph, this scheme can be used to match the voltages on the two generators or maintain a ratio of voltage if the rheostat is used in the field 4.

While my invention has been described as being applicable to paper roll drives, I wish it to be understood that it is not limited to such use but may be used in any drive where the speed tends to change and wherein a corrective influence is produced in proportion to the tendency to change in speed.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A motor speed control system comprising, in combination, a prime mover, a main generator and a regulating generator, both mechanically driven thereby, a driving motor having its armature connected in loop circuit with the generator armature, said regulating generator having three field windings in the same magnetic circuit, a constant potential source for exciting the first winding, a tachometer generator mechanically driven by said driving motor for exciting the second winding, said first and second windings having oppositely acting fields, a main generator shunt field connected in series with the third winding and with the armature of the regulating generator, whereby corrective influences on the speed of the driving motor are provided in accordance with the voltage produced by the tachometer generator.

2. A motor speed control system for maintaining constant linear speed of a strip of material as it is being wound on a roll comprising, in combination, a varying voltage system including a main generator, a regulating generator, each of said generators having a field winding connected in series circuit relationship, a driving motor having an armature connected across the terminals of the main generator armature, a roll for winding strip material mechanically driven by said driving motor, voltage generating means responsive to the circumferential speed of said roll, said regulating generator having in addition to said field winding two additional, oppositely acting field windings in the same magnetic circuit, one of which is controlled by said voltage generating means and the other of which is energized by a constant source of energizing potential, thereby effecting a differentially controlled output of said regulating generator and decrease in speed of said driving motor which is proportional to the increase in circumferential speed of said roll as material is wound thereon.

3. Apparatus for controlling motor speed so as to maintain constant linear speed of a web of material as it is being wound on a roll comprising, in combination, a prime mover, a main generator and a regulating generator, both mechanically driven thereby, each of said generators having a field winding connected in series circuit relationship, a motor energized by said main generator, an idler roller driven by frictional contact with the perimeter of said roll of web material, a tachometer generator driven by said idler roller, said regulating generator having, in addition to said field winding, differential field means controlled by the voltage produced by said tachometer generator, thereby controlling the speed of said driving motor so as to maintain constant linear speed of said web of material.

4. Apparatus as set forth in claim 3 in which said differential field means comprises two additional, oppositely acting field windings on the regulating generator in the same magnetic circuit as the first mentioned winding thereof, one such additional winding being connected across the output terminals of said tachometer generator and the other being connected to a source of constant direct current potential.

5. Apparatus as set forth in claim 3 in which an adjustable resistor is provided in said series circuit including the field windings of said generators, and in which an adjustable source of direct current potential is provided for energizing said differential field means.

6. Apparatus for maintaining constant speed of a direct current motor comprising, in combination, a prime mover, a main generator and a regulating generator, both mechanically driven thereby, each of said generators having a field winding connected in series circuit relationship, a direct current motor energized by said main generator, voltage generating means driven by said motor for generating a voltage proportional to the speed thereof, said regulating generator having in addition to its aforesaid winding differential field means controlled by the voltage of said voltage generating means for controlling the speed of said motor and for maintaining at a fixed value.

7. Apparatus as set forth in claim 6 in which said differential means comprises two additional field windings in the same magnetic circuit as the first mentioned regulating generator winding generating fluxes in opposite directions, one of said additional windings being controlled by said voltage generating means and the other of said additional windings being connected to an adjustable source of direct current potential.

8. Apparatus as set forth in claim 6 in which an adjustable resistor is provided in said series circuit including said field windings of said generators, and in which an adjustable source of direct current potential is provided for energizing said differential means.

9. A speed control system for a direct current motor comprising, in combination, a direct current motor, means for regulating the speed of said motor including a regulating generator having three field windings in the same magnetic circuit the first of which serves as a series output field winding, the second of which serves as a controlling field winding which varies in accordance with the speed of said direct current motor and the third which serves as a pattern field, which is energized by an adjustable source of direct current potential, the second and third field windings being connected in magnetic opposition so as to exercise a differential control function on the first field winding.

10. A regulator system for an electric motor having a generator for supplying current thereto comprising, an exciting circuit for said generator having a regulating generator in series therewith, said regulating generator having a field winding in a circuit separate from its armature circuit, a control generator for supplying current to said winding, and means connecting said control generator to said motor for causing said control generator to vary its output in accordance with variations in the operation of said motor to thereby make said regulating generator and said first named generator compensate for said variations.

11. A regulator system for an electric generator having a load connected thereto comprising, an exciting circuit for said generator having a regulating generator in series therewith, said regulating generator having a field winding in a circuit separate from its armature circuit, a control generator for supplying current to said winding, and means connecting said control generator to said load for rendering its output responsive to variations in said load to thereby make the output of said regulating generator and said first named generator compensate for said variations.

EARL C. WATSON.